March 1, 1966  S. GERESY  3,237,969

TRAILER HITCH LOCKING DEVICE

Filed Jan. 30, 1964  2 Sheets-Sheet 1

INVENTOR.
STEVE GERESY,
BY
Linton and Linton
ATTORNEYS.

March 1, 1966 S. GERESY 3,237,969
TRAILER HITCH LOCKING DEVICE
Filed Jan. 30, 1964 2 Sheets-Sheet 2
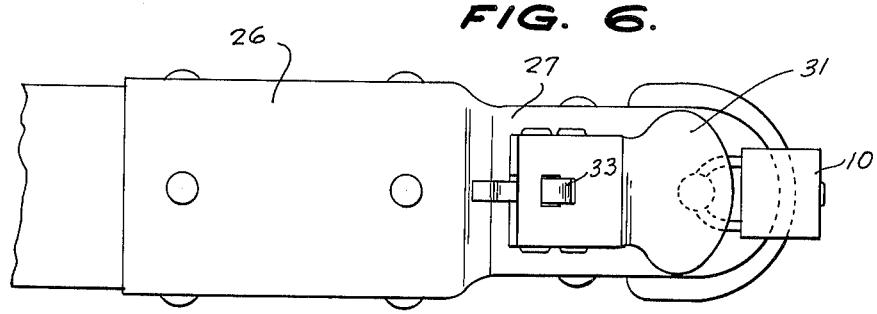
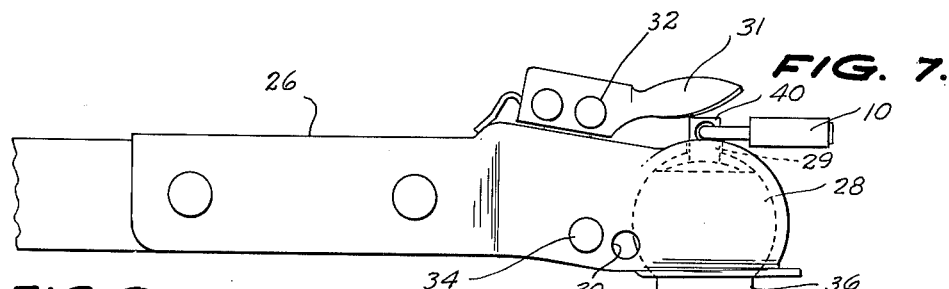
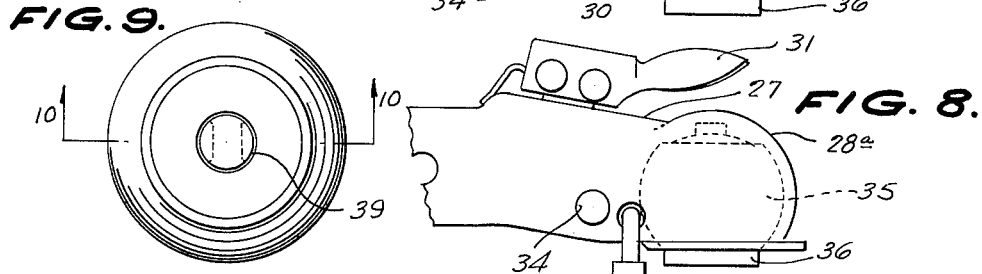
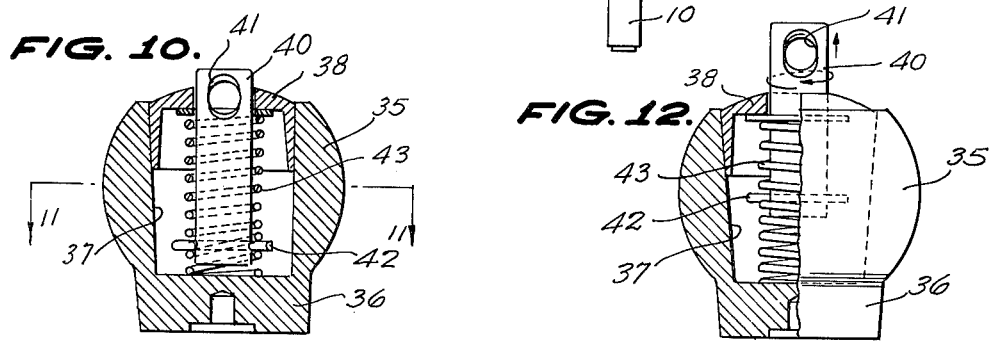
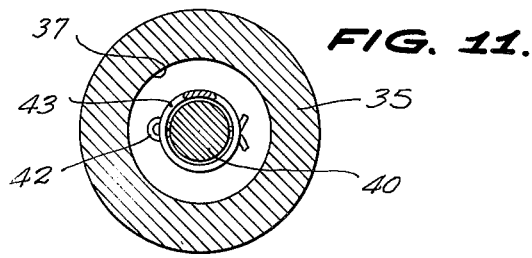
INVENTOR.
STEVE GERESY,
BY
Linton and Linton
ATTORNEYS.

United States Patent Office 3,237,969
Patented Mar. 1, 1966

3,237,969
TRAILER HITCH LOCKING DEVICE
Steve Geresy, Taylor, Mich.
(1115 Holden Ave., Orlando, Fla. 32809)
Filed Jan. 30, 1964, Ser. No. 341,190
1 Claim. (Cl. 280—507)

The present invention relates to trailer hitches and is more particularly concerned with means for preventing the unauthorized connection of trailer hitches to a prime mover.

The principal object of the present invention is to provide devices for use in combination with existing trailer hitches already connected to a trailer for preventing an unauthorized person from connecting a towing vehicle to the hitch when the trailer is temporarily disconnected from its own prime mover as when parked.

Another and important object of the invention is to provide a trailer hitch of a conventional ball-type connector modified to prevent the unauthorized joining thereof to a towing vehicle which can be modified at the factory or by which hitches in use can be modified.

Further objects of the invention will be in part obvious and in part pointed out in the following description of the accompanying drawings in which:

FIG. 6 is a top elevation of a second form of conventional trailer hitch and lock therefor;

FIG. 7 is a side elevation of the members of FIG. 6;

FIG. 8 is a partial view of a third form of trailer hitch with the present locking ball therein;

FIG. 9 is an enlarged top view of the present locking ball;

FIG. 10 is a cross-sectional view taken on line 10—10 of FIG. 9;

FIG. 11 is a cross-sectional view taken on line 11—11 of FIG. 10; and

FIG. 12 is a side elevation partly in section of the locking ball with the pin extended.

Figure 1:
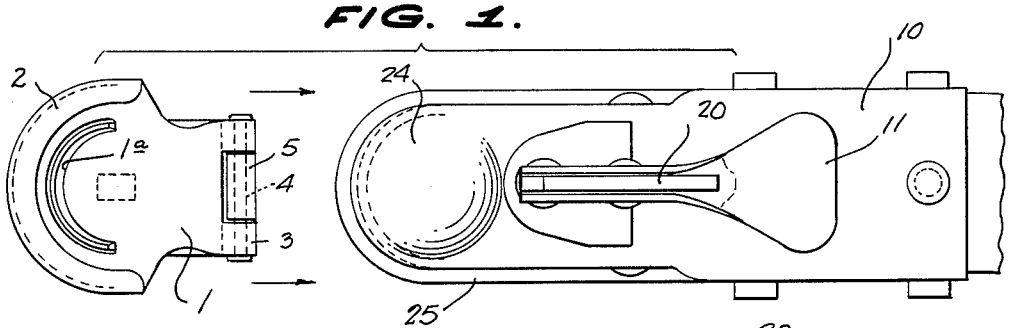
FIG. 1 is an exploded top view of a conventional trailer hitch and an unauthorized use preventing device in position of assembly therewith.
Figure 2:
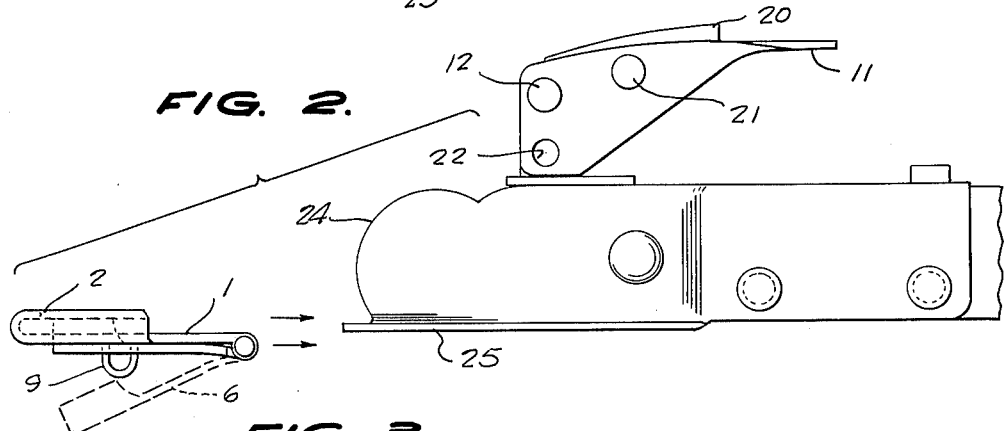
FIG. 2 is an exploded side elevation of the members of FIG. 1.
Figure 3:
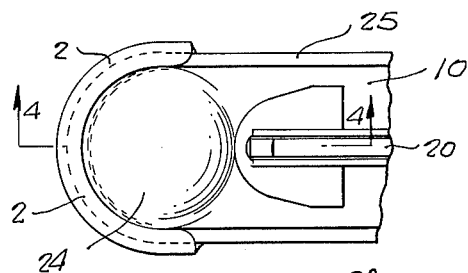
FIG. 3 is a partial top view of the hitch with the unauthorized use preventing device attached thereto.
Figure 5:
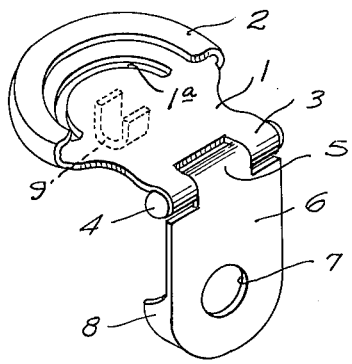
FIG. 5 is a perspective view of the unauthorized use preventing device.

Referring now more particularly to the accompanying drawings wherein like and corresponding parts are designated by similar reference characters, FIGS. 1–15 disclose a form of unauthorized use preventing device for a conventional trailer hitch. As an example, there is shown a know trailer hitch having a top plate 10 above which is positioned an operating handle 11 pivotally connected by pin 12 to a rod 13. A ball engaging member 14 is pivotally connected below said top plate by a pin 15 and has a curved face 16 and a top plate 17. Said rod 13 extends through top plate 10 and top plate 17 and has a nut 18 mounted on the end thereof with a coil spring 19 positioned between plate 10 and nut 18. A locking pin 20 is pivotally connected by pin 21 to handle 11 and has an end for engaging a corresponding end of pin 13 for preventing at times the pivoting of said handle relative to rod 13.

In the operation of these trailer hitches, locking member 20 can be pressed from said handle disengaging rod 13 whereupon said handle can be pivoted upwardly and spring 19 will move the curved face 16 downwardly permitting the insertion of a ball attached to a towing vehicle, into the hitch for joining trailer and towing vehicle. Pivoting handle 11 towards top plate 10 raises face 16 to the position shown in FIG. 4 and locking member 20 retains the elements in said position.

Rod 13 has an opening 23 corresponding to opening 22 in said handle through which a lock can be inserted if desired. Said hitch also has a bulbous hollow 24 with a lateral marginal flange 25.

The present unauthorized use preventing device for use with such a trailer hitch consists of plate 1 having a bent marginal end portion 2 of a U-shaped cross-sectional configuration and also a semi-circular opening 1a. The opposite end of said plate is hinged at 3 to pintle 4 while a second plate 6 is also hinged at 5 to said pintle and further has an opening 7 and a semi-circular lateral flange 8.

Figure 4:
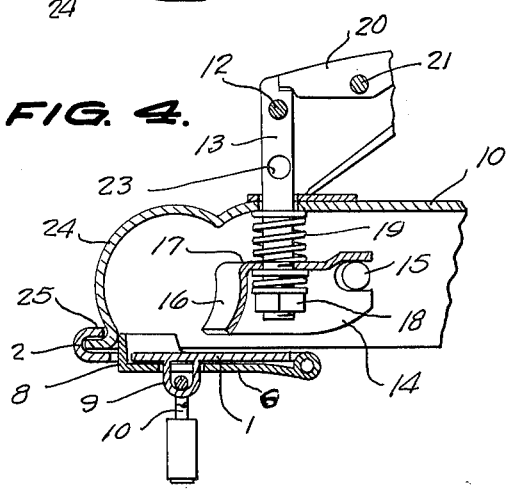
FIG. 4 is a cross-sectional view taken on line 4—4 of FIG. 3.

When said trailer hitch is not connected to the ball of a towing vehicle, but the elements are positioned as shown in FIGS. 1–4, plate 1 can be slid along flange 25 with bent end portion 2 receiving said flange therein. Thereupon plate 6 is pivoted against the bottom of plate 1 with flange 8 extending through opening 1a as shown in FIG. 4, thereby preventing the sliding of plate 1 from flange 25. Eye 9 fixedly attached to the bottom of plate 1 then extends through opening 1a and padlock 10 can be inserted through said eye for locking plates 1 and 6 together.

Thus, the ball of a towing vehicle cannot be inserted in the trailer hitch, and said hitch, therefore, can not be attached to a towing vehicle.

A further form of a conventional trailer hitch is shown in FIGS. 6 and 7 and generally consists of a top plate 26 having a narrowed portion 27, a bulbous end portion 28 and a top opening 29 in said bulbous portion. An opening 30 is sometimes provided in such trailer hitches for receiving a padlock 10 to lock a ball, such as ball 8, in bulbous portion 28. An operating lever 31 is pivotally connected by pin 32 to a pair of levers, not shown, which pivot members similar to members 15 and 17 of FIG. 4, also not shown in FIGS. 6 and 7, but which are pivotally mounted upon a pin 34.

In FIG. 8, there is shown a trailer hitch of conventional type similar to the hitch of FIGS. 6 and 7 but having a bulbous portion 28a without a top opening 29.

A locking ball for use with trailer hitches such as shown in FIGS. 6–8 as well as the hitch shown in FIG. 1, is shown in FIGS. 9–12 and consists of a rounded rigid body 35 having a closed base 36 and a cylindrical open top cavity 37. A cap 38 is fixedly mounted in a conventional manner within the open end of cavity 37 closing the same, but has a central opening 39 through which slideably extends a pin 40. Said pin has a lateral opening 41 in its outer end and a cotter pin 42 extends through another opening in the pin 40 at its inner end with a coil spring 43 encircling said pin 40 between base 36 and top 38 and bearing against cotter pin 42 normally retaining said pin 40 withdrawn in cavity 37 as shown in FIG. 10. Thus, the ball 35 can be inserted in bulbous portion 28a of the trailer hitch as indicated in FIG. 8 and lock 10 inserted through opening 30 retaining said ball within bulbous portion 28a to prevent the connection of the trailer hitch to a towing vehicle.

Said ball 35 can also be inserted in bulbous portion 28 of the hitch of FIGS. 6 and 7 with pin 40 pulled through opening 29 against the action of spring 43, and lock 10 extended through opening 41 for retaining ball 35 in the bulbous portion 28 for likewise preventing the insertion of a towing vehicle ball therein. Thus, the present ball 35 can be used to prevent the unauthorized use of either type of conventional trailer hitch.

The present invention is capable of considerable modification, and such changes thereto as come within the scope of the appended claim are deemed to be a part of the invention.

I claim:

An unauthorized use preventing device for trailer hitches having an open bottom end recess with lateral flanges comprising a plate having a semi-circular recessed end portion of a U-shaped cross-sectional configuration capable of receiving the end portion of the trailer hitch lateral flange and closing the open bottom end recess of the hitch, said plate and also having a semi-circular opening, a second plate hingedly connected to the other end of said first plate and having a semi-circular lateral flange positioned for extending through said first plate opening and abutting an inside edge of the hitch recess when said first plate is superimposed on said second plate, an eye carried by said first plate and said second plate having an opening for receiving said eye therethrough whereby a locking member can be attached to said eye for preventing the withdrawal of said eye through said second plate opening.

References Cited by the Examiner

UNITED STATES PATENTS 2,149,189  2/1939  Shaffer _____ 188—112
2,571,349  10/1951  Eckles _____ 280—507 X LEO FRIAGLIA, *Primary Examiner.*